US012198887B2

(12) United States Patent
Canazon

(10) Patent No.: US 12,198,887 B2
(45) Date of Patent: *Jan. 14, 2025

(54) X-RAY TUBE WITH DISTRIBUTED FILAMENTS

(71) Applicant: John Thomas Canazon, Lawrenceville, GA (US)

(72) Inventor: John Thomas Canazon, Lawrenceville, GA (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/877,037

(22) Filed: Jul. 29, 2022

(65) Prior Publication Data

US 2022/0384137 A1 Dec. 1, 2022

Related U.S. Application Data

(63) Continuation-in-part of application No. 17/077,197, filed on Oct. 22, 2020, now Pat. No. 11,404,235.
(Continued)

(51) Int. Cl.
*H01J 35/14* (2006.01)
*H01J 35/06* (2006.01)
(Continued)

(52) U.S. Cl.
CPC .............. *H01J 35/14* (2013.01); *H01J 35/06* (2013.01); *H01J 35/16* (2013.01); *H05G 1/025* (2013.01); *G21K 5/10* (2013.01); *H01J 2235/163* (2013.01)

(58) Field of Classification Search
CPC .......... H01J 35/14; H01J 35/06; H01J 35/116; H01J 35/13; H01J 2235/068;
(Continued)

(56) References Cited

U.S. PATENT DOCUMENTS 3,591,821 A 7/1971 Seki et al.
3,649,861 A 3/1972 Atlee et al.
(Continued)

FOREIGN PATENT DOCUMENTS

FR 1.365.538 6/1963
GB 1597693 A * 9/1981 .............. H01J 3/027

OTHER PUBLICATIONS

JP 5288839 B2 with English translation (Year: 2013).*

*Primary Examiner* — Chih-Cheng Kao
(74) *Attorney, Agent, or Firm* — Bryan W. Bockhop; Bockhop Intellectual Property Law LLC

(57) ABSTRACT

An x-ray generating unit includes an x-ray tube that is substantially transparent to x-rays. A cathode is within the x-ray tube and defines a plurality of spaced apart cavities. An anode includes a material that emits x-rays when impacted by electrons. A plurality of filaments is each disposed in a different one of the cavities. Each of the filaments is electrically coupled to each other and to an activating voltage source in parallel. Each of the filaments emits a focused electron beam directed to a different predetermined spot on the anode upon application of a predetermined voltage between the cathode and the anode, thereby causing the anode to generate x-rays. Each of the plurality of spaced apart cavities is aimed at the anode so that each predetermined spot on the anode is separated from each other spot by a gap that is not impacted by an electron beam.

19 Claims, 3 Drawing Sheets

Related U.S. Application Data

(60) Provisional application No. 62/970,545, filed on Feb. 5, 2020.

(51) Int. Cl.
*H01J 35/16* (2006.01)
*H05G 1/02* (2006.01)
*G21K 5/10* (2006.01)

(58) Field of Classification Search
CPC ......... H01J 2235/086; H01J 2235/1216; H01J 2235/1262; H01J 2235/163
See application file for complete search history.

(56) References Cited

U.S. PATENT DOCUMENTS

| | | | | | |
|---|---|---|---|---|---|
| 4,065,689 | A * | 12/1977 | Pleil | H01J 35/147 378/138 |
| 4,274,005 | A * | 6/1981 | Yamamura | H05G 1/02 378/10 |
| 4,928,296 | A * | 5/1990 | Kadambi | H01J 35/107 378/127 |
| 11,404,235 | B2 * | 8/2022 | Canazon | H01J 35/116 |
| 2005/0031083 | A1 * | 2/2005 | Kindlein | H01J 35/20 378/136 |
| 2015/0078510 | A1 * | 3/2015 | Tang | H01J 35/064 378/92 |
| 2020/0343069 | A1 * | 10/2020 | Zhu | A61B 6/4021 |

* cited by examiner

X-RAY TUBE WITH DISTRIBUTED FILAMENTS

CROSS-REFERENCE TO RELATED APPLICATION(S)

This application is a continuation-in-part of and claims the benefit of U.S. patent application Ser. No. 17/077,197, filed Oct. 22, 1920, which claims the benefit of U.S. Provisional Patent Application Ser. No. 62/970,545, filed Feb. 5, 2020, the entirety of each of which is hereby incorporated herein by reference.

BACKGROUND OF THE INVENTION

1. Field of the Invention

The present invention relates to x-ray generating tubes and, more specifically, to x-ray tubes adapted for irradiating products.

2. Description of the Related Art

X-rays are used in a variety of applications such as imaging and product irradiation. Imaging applications include producing x-rays for computer aided tomography (CAT) scans. Irradiation applications include producing x-rays used to sterilize packaged food and other products. Imaging applications tend to require relatively less x-ray power than do high throughput irradiation applications.

Existing x-ray tubes include a hot or cold cathode, a filament (such as a tungsten filament in hot cathode embodiments) that is electrically coupled to the cathode, an anode that is spaced away from the filament and a target (such as a gold or tungsten target). In some embodiments, the anode also acts as the target. Certain x-ray tubes employ a very pointy cathode, without a separate filament, to generate electrons. Such cathodes are referred to as "cold cathodes." The space between the cathode and the anode is substantially a vacuum. With sufficient voltage applied between the cathode and the anode, then the cathode (either cold or hot) will emit electrons which are accelerated toward the anode and strike the target, thereby generating x-rays.

The impingement of the electrons on the target generates heat. Any given x-ray power output from a single cathode will result in the generation of a certain amount of heat at this single location. Because of this, many x-ray tubes use a cooling system through which flows a coolant (such as water or an oil) to carry off heat or a rotary anode target. The tube is limited to a maximum x-ray output by the maximum amount of heat that can be concentrated at the single location on the target given the efficiency of the cooling system. Excessive heat can lead to the destruction of the anode as well as a loss of vacuum, leading to high voltage arcs.

Because the power output required for irradiation applications is limited by the amount of heat at the electron impingement point of the x-ray tube, such applications often require multiple tubes operating simultaneously to generate enough x-rays for successful irradiation or extensively long cycle times. Use of multiple tubes can be expensive and can require extra apparatus for powering, cooling and controlling all of the tubes. Long cycle times reduce overall throughput of the machine Therefore, there is a need for a single high power x-ray tube for generating x-rays used in irradiation processes.

SUMMARY OF THE INVENTION

In one aspect, the invention is an x-ray generating unit that includes an x-ray tube that is substantially transparent to x-rays and that defines a vacuum therein. A cathode is disposed within the x-ray tube and defines a plurality of spaced apart cavities. An anode is spaced apart from the cathode and includes a material that emits x-rays when impacted by electrons. A plurality of filaments is each disposed in a different one of the cavities defined by the cathode and each is electrically coupled to the cathode. Each filament emits a focused electron beam directed to a different predetermined spot on the anode upon application of a predetermined voltage between the cathode and the anode, thereby causing the anode to generate x-rays.

In another aspect, the invention is an x-ray generator that includes an elongated linear x-ray tube, having a center, that is substantially transparent to x-rays and that defines a vacuum therein. The x-ray tube has a circular cross section. A cathode includes an elongated rod that extends along the center of the elongated tube and defines a plurality of spaced apart cavities. An anode is spaced apart from the cathode and includes a material that emits x-rays when impacted by electrons. The anode has an arcuate cross section that is less than 180°. A plurality of filaments, each disposed in a different one of the cavities defined by the cathode, each emit a focused electron beam directed to a different predetermined spot on the anode upon application of a predetermined voltage between the cathode and the anode, thereby causing the anode to generate x-rays. An outer tube is disposed about the x-ray tube and defines a gap therebetween through which a cooling fluid flows.

In another aspect, the invention is an x-ray generator that includes a toroidal x-ray tube, having a center, that is substantially transparent to x-rays and that defines a vacuum therein. The x-ray tube has a circular cross section. A circular cathode is disposed along the center of the toroidal x-ray tube and defines a plurality of spaced apart cavities. An anode is spaced apart from the cathode and includes a material that emits x-rays when impacted by electrons. The anode has an arcuate cross section that is less than 180°. A plurality of filaments are each disposed in a different one of the cavities defined by the cathode along a circular line running on one side of the circular structure. Each of the plurality of filaments is configured to emit a focused electron beam directed to a different predetermined spot on the anode upon application of a predetermined voltage between the cathode and the anode, thereby causing the anode to generate x-rays. An outer tube is disposed about the x-ray tube and defines a gap therebetween through which a cooling fluid flows.

In another aspect, the invention is an x-ray generating unit that includes an x-ray tube that is substantially transparent to x-rays and that defines a vacuum therein. A cathode is disposed within the x-ray tube and defines a plurality of spaced apart cavities. An anode is spaced apart from the cathode and includes a material that emits x-rays when impacted by electrons. A plurality of filaments is each disposed in a different one of the cavities defined by the cathode. Each of the plurality of filaments is electrically coupled to each other and to an activating voltage source in parallel. Each of the plurality of filaments emits a focused electron beam directed to a different predetermined spot on the anode upon application of a predetermined voltage between the cathode and the anode, thereby causing the anode to generate x-rays. Each of the plurality of spaced apart cavities is aimed at the anode so that each predetermined spot on the anode is separated from each other spot by a gap that is not impacted by an electron beam.

In another aspect, the invention is an x-ray generator that includes an elongated linear x-ray tube, having a center, that is substantially transparent to x-rays and that defines a vacuum therein. The x-ray tube has a circular cross section. A cathode includes an elongated rod that extends along the center of the elongated tube and defines a plurality of spaced apart cavities. An anode that is spaced apart from the cathode and includes a material that emits x-rays when impacted by electrons. The anode has an arcuate cross section that is less than 180°. A plurality of filaments is each disposed in a different one of the cavities defined by the cathode. Each of the plurality of filaments is electrically coupled to each other and to an activating voltage source in parallel. Each of the filaments emits a focused electron beam directed to a different predetermined spot on the anode upon application of a predetermined voltage between the cathode and the anode, thereby causing the anode to generate x-rays. An outer tube disposed about the x-ray tube defines a gap therebetween through which a cooling fluid flows. Each of the plurality of spaced apart cavities is aimed at the anode so that each predetermined spot on the anode is separated from each other spot by a gap that is not impacted by an electron beam.

In yet another aspect, the invention is an x-ray generator, including a toroidal x-ray tube, having a center, that is substantially transparent to x-rays and that defines a vacuum therein. The x-ray tube has a circular cross section. A circular cathode is disposed along the center of the toroidal x-ray tube. The cathode defines a plurality of spaced apart cavities. An anode is spaced apart from the cathode and includes a material that emits x-rays when impacted by electrons. The anode has an arcuate cross section that is less than 180°. Each of a plurality of filaments is disposed in a different one of the cavities defined by the cathode along a circular line running on one side of a circular structure of the circular cathode. Each of the plurality of filaments is electrically coupled to each other and to an activating voltage source in parallel. Each of the plurality of filaments is configured to emit a focused electron beam directed to a different predetermined spot on the anode upon application of a predetermined voltage between the cathode and the anode, thereby causing the anode to generate x-rays. An outer tube is disposed about the x-ray tube and defines a gap therebetween through which a cooling fluid flows. Each of the plurality of spaced apart cavities is aimed at the anode so that each predetermined spot on the anode is separated from each other spot by a gap that is not impacted by an electron beam.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
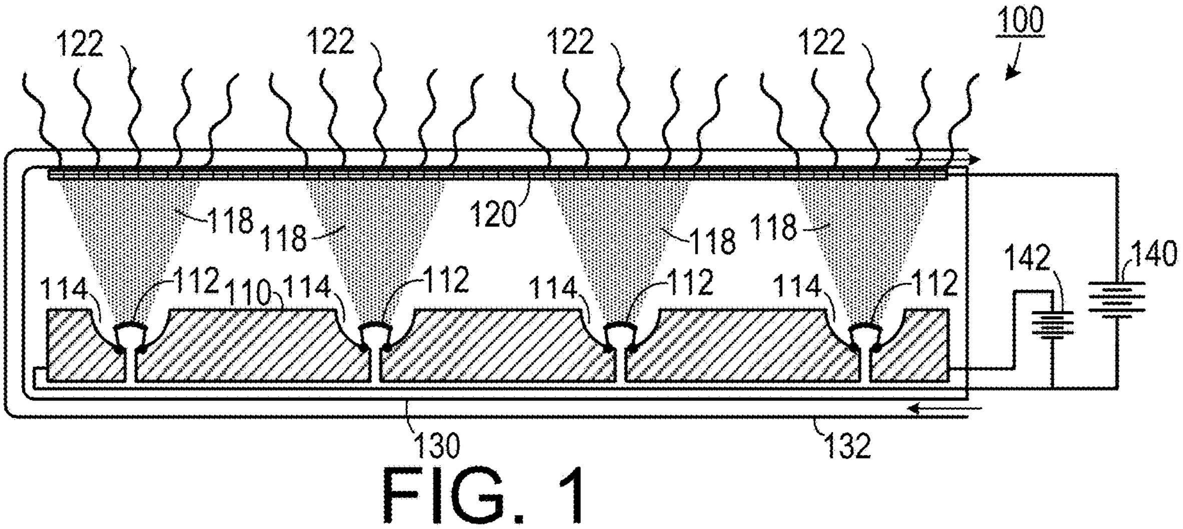
FIG. 1 is a schematic diagram of a linear multi-filament x-ray tube.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of “a,” “an,” and “the” includes plural reference, the meaning of “in” includes “in” and “on.”

As shown in FIG. 1, one embodiment of an x-ray tube 100 includes a plurality of filaments 112, each of which is disposed in a cavity 114 in a common cathode 110. A target/anode 120 is spaced apart from the filaments 112. When a sufficient voltage from a voltage source 140 is applied between the filaments 112 and the target 120, the filaments 112 emit corresponding electron beams 118 that are focused by the cavities 114. Typically, the filaments are connected in series to an activating voltage source 142 that applies a voltage across the filaments 112 to heat them as a result of resistance heating so as to reduce the work function in giving off electrons. The cavities 114 focuses an electron beam 118 from each of the filaments 112 to different spots on a target/anode 120 so that each spot on the target/anode 120 is separated from each other spot by a gap 119 that is not impacted by an electron beam 118. Each of the filaments 112 generates electron beams 114 simultaneously in substantially the same amount. When the electron beams 118 hit the target 120, the target 120 produces x-rays 122. A vacuum tube 130 surrounds these elements and a vacuum is maintained inside the vacuum tube 130. An external cooling tube 132 surrounds the vacuum tube 130 and allows a cooling fluid to flow around the vacuum tube 130 to remove heat therefrom. The tubes 130 and 132 can include any of the materials out of which x-ray tubes are typically made (e.g., glass, ceramics and certain metals).

The filaments 112 are distributed so that heat is generated at different locations on the target/anode 120. As a result, the x-ray tube 100 can generate multiple times the power output of a single-filament x-ray tube using better cooling efficiency than the single-filament x-ray tube. For example, a four-filament system can generate the same amount of x-rays at each location on the anode as a single-filament tube—which cumulatively generates four times the x-ray power level as a single-filament tube, heating each electron impingement spot on the target to the same temperature as a single-filament tube, thereby increasing the cooling efficiency.

Figure 2A:
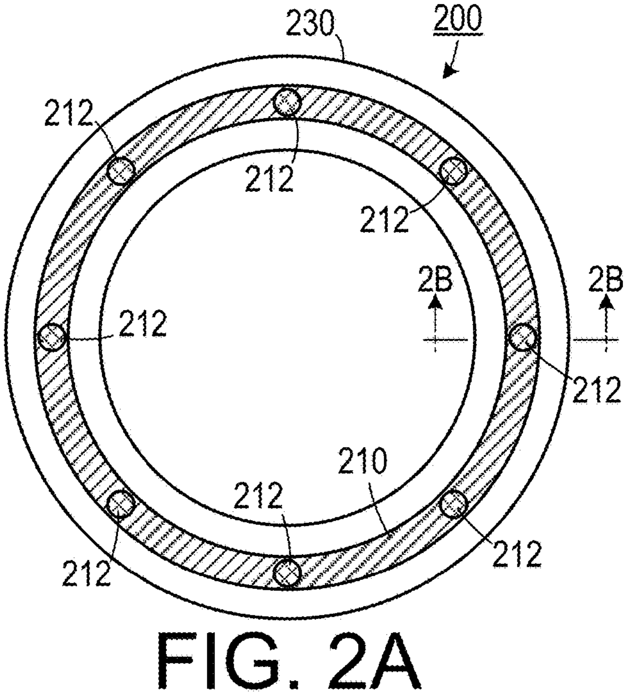
FIG. 2A is a schematic diagram of a toroidal multi-filament x-ray tube.
Figure 2B:
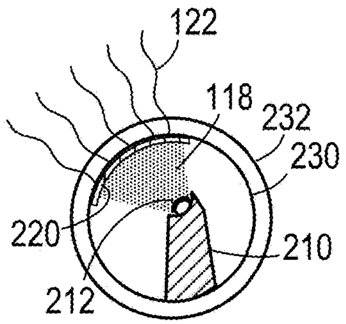
FIG. 2B is a cross-sectional view of the toroidal multi-filament x-ray tube shown in FIG. 2A, take along line 2B-2B.

As shown in FIGS. 2A-2B, a toroidal embodiment of an x-ray tube 200 employs a toroidal vacuum tube 230 in which is disposed a circular cathode 210 to which several evenly spaced-apart filaments 212 are affixed. (FIG. 2A does not show the cooling tube for the sake of simplicity. The cooling tube 232 is shown in FIG. 2B.) X-ray emission radiates in all directions from the target 220. The cathode shape and angle determine the location that the electron beam will hit on the target 220.

Figure 3A:
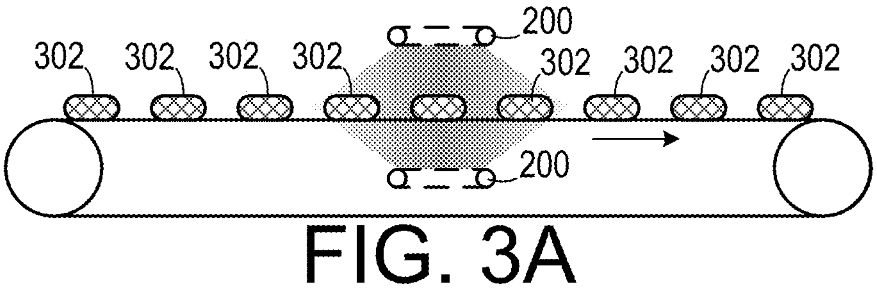
FIG. 3A is a schematic diagram showing irradiation of products using two toroidal x-ray tubes.
Figure 3B:
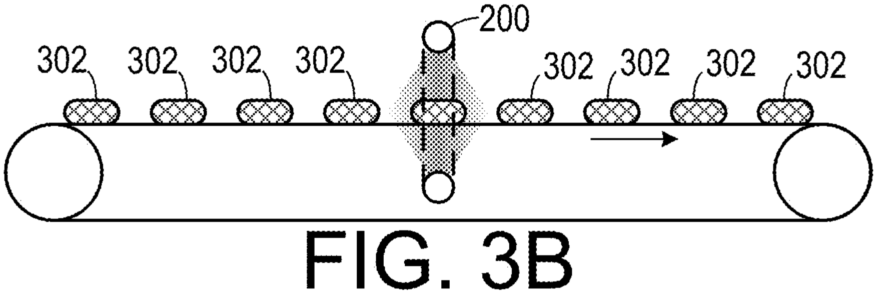
FIG. 3B is a schematic diagram showing irradiation of products passing through a single toroidal x-ray tube.

As shown in FIG. 3A, one method of irradiating a product 302 includes passing the product 202 between two toroidal x-ray tubes 200. This embodiment irradiates both sides of the product 302 simultaneously. As shown in FIG. 3B, in a second method of irradiating a product 302, the product 302 is passed through a singlet toroidal x-ray tube 200. This method can be applied when the product 302 is small enough so that it can fit inside of the toroidal x-ray tube 200.

Figure 4A:
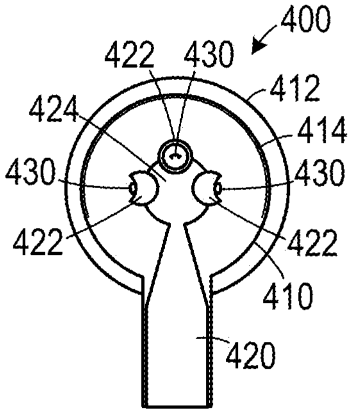
FIG. 4A is an elevational view schematic diagram of a spherical x-ray tube.
Figure 4B:
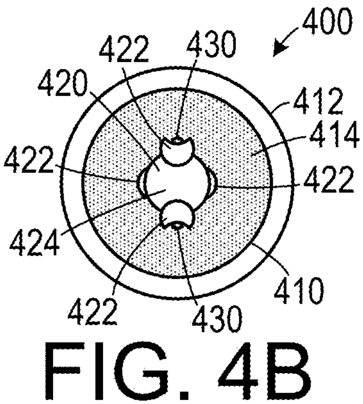
FIG. 4B is a top plan view schematic diagram of the embodiment shown in FIG. 4A.

A spherical embodiment of an x-ray tube 400 is shown in FIGS. 4A-4B. Similarly, a domed embodiment may be used. In this embodiment, filaments 430 are distributed evenly about a portion of an outer surface of a spherical end 424 of the cathode 420. Filament projections 422 can extend from the spherical end 424 and can define the focusing cavities for the filaments 430. The target 414 is applied to an inner surface of the spherical portion of the x-ray tube 410. A cooling jacket tube 412 surrounds the spherical portion of the x-ray tube 410. This embodiment can generate x-rays that are distributed in the volume around the spherical portion of the x-ray tube 410. This embodiment can apply x-rays to the inside surface of a hollow object or slurry.

The invention can include a linear cathode with the filaments spaced apart along a line. It can also include filaments that are distributed evenly around a cathode with a two-dimensional or three-dimensional shape, such as a toroid or a sphere.

One advantage of this system includes that it is able to generate a higher x-ray power level with the same form factor and about same cost as a prior art x-ray tube.

In one embodiment, each location of desired electron Emission has more than one filament but with only one as the active and the others as Spares. If a filament breaks or has undesired characteristics, a jumper on the tube in changed thereby activating one of the spare filaments instead. (More than one filament in a single location can also be activated at once if desired.)

In a typical embodiment used to irradiate objects does not include any shielded windows (of the type used in many imaging x-ray tubes) to allow a maximum amount of x-rays to irradiate the objects.

Figure 5:
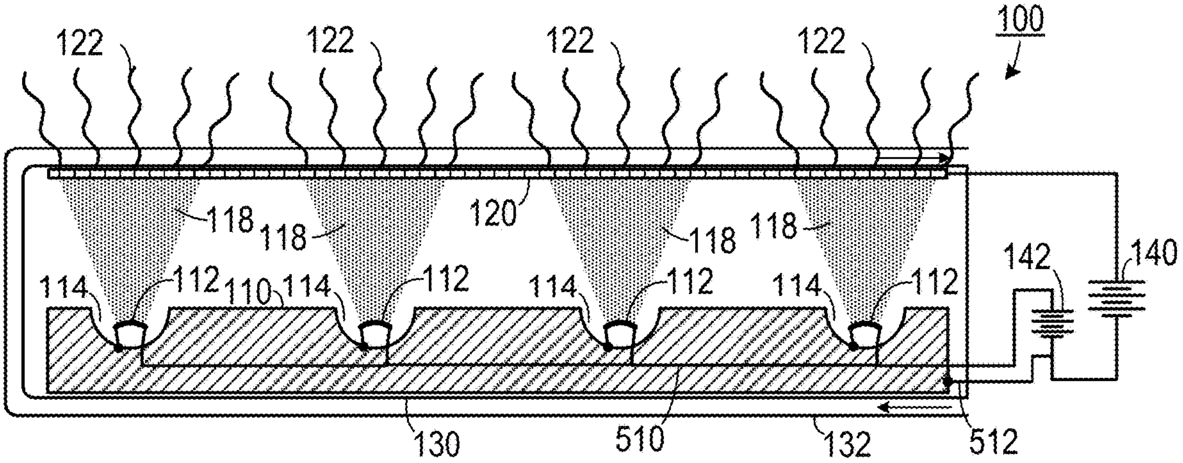
FIG. 5 is a schematic diagram showing an x-ray tube in which the filaments are connected in parallel to a voltage source.

As shown in FIG. 5, in one embodiment the filaments 112 are electrically coupled to each other in parallel. The first terminal of each filament 112 is electrically coupled to a first rail 510 that is coupled to a first terminal of the activating voltage source 142 and the second terminal of each filament 112 is electrically coupled to a second rail 512 that is coupled to a second terminal of the activating voltage source 142. (In the example shown, the cathode 110 is electrically conductive, so the cathode 110 serves as the second rail 512.) Connecting the filaments 112 in parallel ensures that the voltage across each filament 112 is the same. Since the heat generated by a filament 112 is a function of the voltage across the filament 112, connecting them in parallel maintains the heat generated by each filament 112 at a constant level.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, “each” refers to each member of a set or each member of a subset of a set. It is intended that the claims and claim elements recited below do not invoke 35 U.S.C. § 112(f) unless the words “means for” or “step for” are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An x-ray generating unit, comprising:

(a) an x-ray tube that is substantially transparent to x-rays and that defines a vacuum therein;

(b) a cathode disposed within the x-ray tube, the cathode defining a plurality of spaced apart cavities;

(c) an anode spaced apart from the cathode and including a material that emits x-rays when impacted by electrons; and (d) a plurality of filaments, each disposed in a different one of the cavities defined by the cathode and each of the plurality of filaments electrically coupled to each other and to an activating voltage source in parallel, that each emits a focused electron beam directed to a different predetermined spot on the anode upon application of a predetermined voltage between the cathode and the anode, thereby causing the anode to generate x-rays, wherein each of the plurality of spaced apart cavities is aimed at the anode so that each predetermined spot on the anode is separated from each other spot by a gap that is not impacted by an electron beam.

2. The x-ray generating unit of claim 1, wherein the x-ray tube has a circular cross section and wherein the anode has an arcuate cross section that is less than 180°.

3. The x-ray generating unit of claim 1, wherein each of the plurality of filaments includes a first contact that is electrically coupled to a first terminal and a second contact that is electrically coupled to a second terminal, different from the first terminal, of the activating voltage source.

4. The x-ray generating unit of claim 1, wherein the predetermined voltage is supplied by a voltage source that is electrically coupled between the anode and the plurality of filaments.

5. The x-ray generating unit of claim 1, wherein the x-ray tube comprises an elongated linear tube and wherein the cathode comprises an elongated rod that extends along the elongated tube, in which the filaments are disposed along one side of the elongated rod.

6. The x-ray generating unit of claim 1, wherein the x-ray tube comprises a toroidal tube and wherein the cathode comprises a circular structure in which the filaments are disposed along a circular line running on one side of the circular structure.

7. The x-ray generating unit of claim 6, wherein when the toroidal tube lies along a plane, each electron beam is directed in a direction that is transverse to the plane.

8. The x-ray generating unit of claim 6, wherein each electron beam is directed to an area that lies in a center portion of the x-ray tube.

9. The x-ray generating unit of claim 1, wherein the x-ray tube comprises a spherical tube and wherein a portion of the cathode is substantially spherical, and wherein the filaments are distributed radially about the portion of the cathode.

10. The x-ray generating unit of claim 1, further comprising an outer tube disposed about the x-ray tube that defines a gap therebetween through which a cooling fluid flows.

11. An x-ray generator, comprising:

(a) an elongated linear x-ray tube, having a center, that is substantially transparent to x-rays and that defines a vacuum therein, the x-ray tube having a circular cross section;

(b) a cathode that includes an elongated rod that extends along the center of the elongated tube and that defines a plurality of spaced apart cavities;

(c) an anode spaced apart from the cathode and including a material that emits x-rays when impacted by electrons and the anode having an arcuate cross section that is less than 180°;

(d) a plurality of filaments, each disposed in a different one of the cavities defined by the cathode, each of the plurality of filaments electrically coupled to each other and to an activating voltage source in parallel, that each emits a focused electron beam directed to a different predetermined spot on the anode upon application of a predetermined voltage between the cathode and the anode, thereby causing the anode to generate x-rays; and (e) an outer tube disposed about the x-ray tube that defines a gap therebetween through which a cooling fluid flows, wherein each of the plurality of spaced apart cavities is aimed at the anode so that each predetermined spot on the anode is separated from each other spot by a gap that is not impacted by an electron beam.

12. The x-ray generator of claim 11, wherein each of the plurality of filaments includes a first contact that is electrically coupled to a first terminal and a second contact that is electrically coupled to a second terminal, different from the first terminal, of the activating voltage source.

13. The x-ray generator of claim 11, wherein the predetermined voltage is supplied by a voltage source that is electrically coupled between the anode and the plurality of filaments.

14. The x-ray generator of claim 11, wherein the x-ray tube comprises an elongated linear tube and wherein the cathode comprises an elongated rod that extends along a center of the elongated tube, in which the filaments are disposed along one side of the elongated rod.

15. An x-ray generator, comprising:

(a) a toroidal x-ray tube, having a center, that is substantially transparent to x-rays and that defines a vacuum therein, the x-ray tube having a circular cross section;

(b) a circular cathode disposed along the center of the toroidal x-ray tube that defines a plurality of spaced apart cavities;

(c) an anode spaced apart from the cathode and including a material that emits x-rays when impacted by electrons and the anode having an arcuate cross section that is less than 180°;

(d) a plurality of filaments, each disposed in a different one of the cavities defined by the cathode along a circular line running on one side of a circular structure of the circular cathode, each of the plurality of filaments electrically coupled to each other and to an activating voltage source in parallel, each of the plurality of filaments configured to emit a focused electron beam directed to a different predetermined spot on the anode upon application of a predetermined voltage between the cathode and the anode, thereby causing the anode to generate x-rays; and (e) an outer tube disposed about the x-ray tube that defines a gap therebetween through which a cooling fluid flows, wherein each of the plurality of spaced apart cavities is aimed at the anode so that each predetermined spot on the anode is separated from each other spot by a gap that is not impacted by an electron beam.

16. The x-ray generator of claim 15, wherein each of the plurality of filaments includes a first contact that is electrically coupled to a first terminal and a second contact that is electrically coupled to a second terminal, different from the first terminal, of the activating voltage source.

17. The x-ray generator of claim 15, wherein the predetermined voltage is supplied by a voltage source that is electrically coupled between the anode and the plurality of filaments.

18. The x-ray generator of claim 17, wherein when the toroidal tube lies along a plane, each electron beam is directed in a direction that is transverse to the plane.

19. The x-ray generator of claim 17, wherein each electron beam is directed to an area that lies in a center portion of the x-ray tube.

* * * * *